United States Patent [19]
Ohki

[11] Patent Number: 5,719,628
[45] Date of Patent: Feb. 17, 1998

[54] VIDEO SIGNAL CODING METHOD AND APPARATUS

[75] Inventor: Junichi Ohki, Tokyo, Japan

[73] Assignee: Nec Corporation, Tokyo, Japan

[21] Appl. No.: 676,901

[22] Filed: Jul. 8, 1996

Related U.S. Application Data

[63] Continuation of Ser. No. 201,322, Feb. 24, 1994, abandoned.

[30] Foreign Application Priority Data

Feb. 25, 1993 [JP] Japan ............... 5-035927

[51] Int. Cl.⁶ ............... H04N 07/18
[52] U.S. Cl. ............... 348/402; 348/409; 348/411; 348/412; 348/416; 348/699; 348/700; 348/415
[58] Field of Search ............... 348/699, 700, 348/416, 415, 411, 412, 409, 402

[56] References Cited

U.S. PATENT DOCUMENTS

| | | | |
|---|---|---|---|
| 4,792,851 | 12/1988 | Mochizuki | 348/409 |
| 4,805,017 | 2/1989 | Kaneko et al. | 348/402 |
| 4,816,406 | 3/1989 | Kummerfeldt et al. | 348/401 |
| 4,999,704 | 3/1991 | Ando | 348/401 |
| 5,005,076 | 4/1991 | Stroppina et al. | 358/135 |
| 5,012,337 | 4/1991 | Gillard | 348/416 |
| 5,040,061 | 8/1991 | Yonemitsu | 348/409 |
| 5,068,724 | 11/1991 | Krause et al. | 348/409 |
| 5,093,720 | 3/1992 | Krause et al. | 348/419 |
| 5,121,202 | 6/1992 | Tanoi | 348/401 |
| 5,144,428 | 9/1992 | Okuda et al. | 348/409 |
| 5,193,004 | 3/1993 | Wang et al. | 348/416 |
| 5,243,420 | 9/1993 | Hibi | 348/402 |
| 5,249,048 | 9/1993 | Sugiyama | 358/136 |
| 5,253,056 | 10/1993 | Puri et al. | 348/415 |
| 5,260,783 | 11/1993 | Dixit | 348/416 |
| 5,268,755 | 12/1993 | Nishino et al. | 358/136 |
| 5,293,229 | 3/1994 | Iu | 348/415 |
| 5,347,308 | 9/1994 | Wai | 348/394 |
| 5,369,449 | 11/1994 | Yukitake et al. | 348/409 |

*Primary Examiner*—Tommy P. Chin
*Attorney, Agent, or Firm*—Sughrue, Mion, Zinn, Macpeak & Seas, PLLC

[57] ABSTRACT

An efficient coding system for interlaced video sequences with forced refreshing capabilities. An input picture of is divided into two fields, a first and a second field. Certain lines or portions of lines in each respective field are designated for forced refreshing, while the non-designated lines are interframe prediction coded. The designated lines of first field are intrafield prediction coded, while the designated lines of the second field are interfield prediction coded. The selection and implementation of the refreshing of the first and second fields is executed by the controller and switching circuitry of the coding system.

6 Claims, 6 Drawing Sheets

VIDEO SIGNAL CODING METHOD AND APPARATUS

This is a Continuation of application Ser. No. 08/201,322, filed on Feb. 24, 1994 now abandoned.

BACKGROUND OF THE INVENTION

The present invention relates to a video signal coding technique for efficiently coding an input video signal, and more particularly to a refreshing or forced updating technique indispensable for interframe coding utilizing the interframe correlation of video signals.

For interframe coding, there are provided frame memories for storing video signals for one frame in the encoding and the decoding apparatuses. The coding apparatus generates an interframe prediction signal from a local decoded signal of the preceding frame stored in its frame memory. The coding apparatus generates an interframe prediction error signal from the interframe prediction signal and input video signal, quantizes the interframe prediction signal, variable word length codes the quantized signal, and transmits the coded signal to the decoding apparatus. It also adds the quantized interframe prediction error signal and the interframe prediction signal to obtain the local decoded signal, and stores it into its frame memory.

The decoding apparatus, on the other hand, adds the prediction error signal from the coding apparatus to the reproduced video signals of the preceding frame stored in its frame memory, and generates and supplies a reproduced video signal for the current frame. The reproduced video signal is stored into the frame memory for use in decoding a video signal for the next frame.

In this interframe coding, it is prerequisite that, if a transmission delay by a certain time length is ignored, the contents of the frame memory of the coding apparatus are always identical with those of the frame memory of the decoding apparatus. However, if any transmission error occurs on the transmission line, this prerequisite will no longer hold with the result that the distortion in the decoded image on the receiving side, arising from that transmission error, will remain forever.

In order to recover the image from such distortion due to a transmission error, systems using interframe coding utilize a technique known as refreshing, or forced updating. For this refreshing technique, reference may be made to, for example, the U.S. Pat. No. 4,985,768. According to this refreshing technique, video signals on some scanning lines are subjected to intra-field coding, for instance orthogonal transform coding, instead of interframe coding and transmitted to the decoding apparatus, and subjects video signals on all the scanning line for a certain period of time, for example a 60-frame period, to intra-field coding.

However, this refreshing technique according to the prior art, as it uses intra-field coding which is inferior in coding efficiency to interframe coding, requires a greater quantity of codes for the refreshing purpose.

In a usual video signal coding apparatus, not necessarily one using inter-frame coding, a buffer memory is provided at the output end of the transmission path, and rate matching is performed between a sequence of codes representing prediction error signals generating at random and the transmission path of a fixed transmission rate. In doing so, in order to prevent the buffer memory from overflow or underflow, the coarseness of the quantizing characteristic to be applied to the prediction error signal is controlled in accordance with the occupancy of the buffer memory. As stated above, interframe coding requires a large quantity of codes for refreshing. Since this quantity of codes constitutes a heavy overhead in buffer occupancy control, the relative magnitude of the quantity of codes needed for refreshing has a significant impact on the quality of the reproduced image on the receiving side.

In recent years, motion compensated interframe coding, which excels in coding efficiency over the interframe coding, and hybrid coding combining motion compensated interframe coding and transform coding have come into practical use. For these coding methods, too, refreshing is indispensable. However, the difference in coding efficiency between these coding methods and intra-frame coding is greater than that between interframe coding and intra-frame coding. Therefore, the aforementioned problem of overhead in buffer occupancy control is even more serious in these coding methods.

SUMMARY OF THE INVENTION

According to the present invention, there is provided a coding method for coding an input video signal interlaced at a rate of 2:1, comprising steps:

(a) identifying a first field and a second field of each frame of the input video signal on the basis of the vertical synchronization signal and the horizontal synchronization signal of said input video signal, and successively designating some of the scanning lines of each field of each frame in a predetermined period on a frame-by-frame basis;

(b) generating a first prediction signal by using the interframe correlation of said input video signal, for the video signal of the scanning lines not designated at said step (a), and generating a prediction error signal by using said first prediction signal;

(c) generating a prediction error signal, by using intra-field correlation, for the video signal of the scanning lines identified with a first field at said step (a) and designated at said step (a);

(d) generating a second prediction signal, by using interfield correlation, for the video signals of the scanning lines identified with a second field at said step (a) and designated at said step (a), and generating a prediction error signals by using said second prediction signal; and (e) coding the prediction error signal generated at said steps (b), (c) and (d).

According to the invention, there is also provided a coding apparatus for coding input video signals interlaced at a rate of 2:1, comprising:

a control circuit for determining whether a first field or a second field have been entered on the basis of the vertical synchronization signal and the horizontal synchronization signal of said input video signal, successively designating scanning lines of each field of each frame in a predetermined period, and supplying a switch control signal indicating whether said input video signal belongs to the first or the second field and whether or not each scanning line is designated;

a subtractor for generating a first signal from said input video signal and prediction signals;

a conversion circuit for subjecting said first signal to orthogonal transformation and quantization to generate a second signal;

a coding circuit for subjecting said second signal to variable word length coding and supplying a sequence of variable word length codes;

an inverse orthogonal transformation circuit for subjecting said second signal to inverse orthogonal transformation to generate a third signal;

an adder for adding said prediction signal and said third signal to generate a local decoded signal;

a frame memory, to which said local decoded signal is supplied, for outputting first predicting signal, generated by delaying said local decoded signal by one frame, and a second prediction signal, generated by delaying the local decoded signal by one field; and a first switch for supplying said first prediction signal as said prediction signal when said switch control signal indicates that the input video signal is not of a designated scanning line; supplying a zero value as said prediction signal when said switch control signal indicates the first field and a designated scanning line; and supplying said second prediction signal as said prediction signal when said switch control signal indicates the second field and a designated scanning line.

BRIEF DESCRIPTION OF THE DRAWINGS

FIG. 1 is diagrams for describing refreshing operations, wherein.

DESCRIPTION OF THE PREFERRED EMBODIMENTS

Figure 1A:
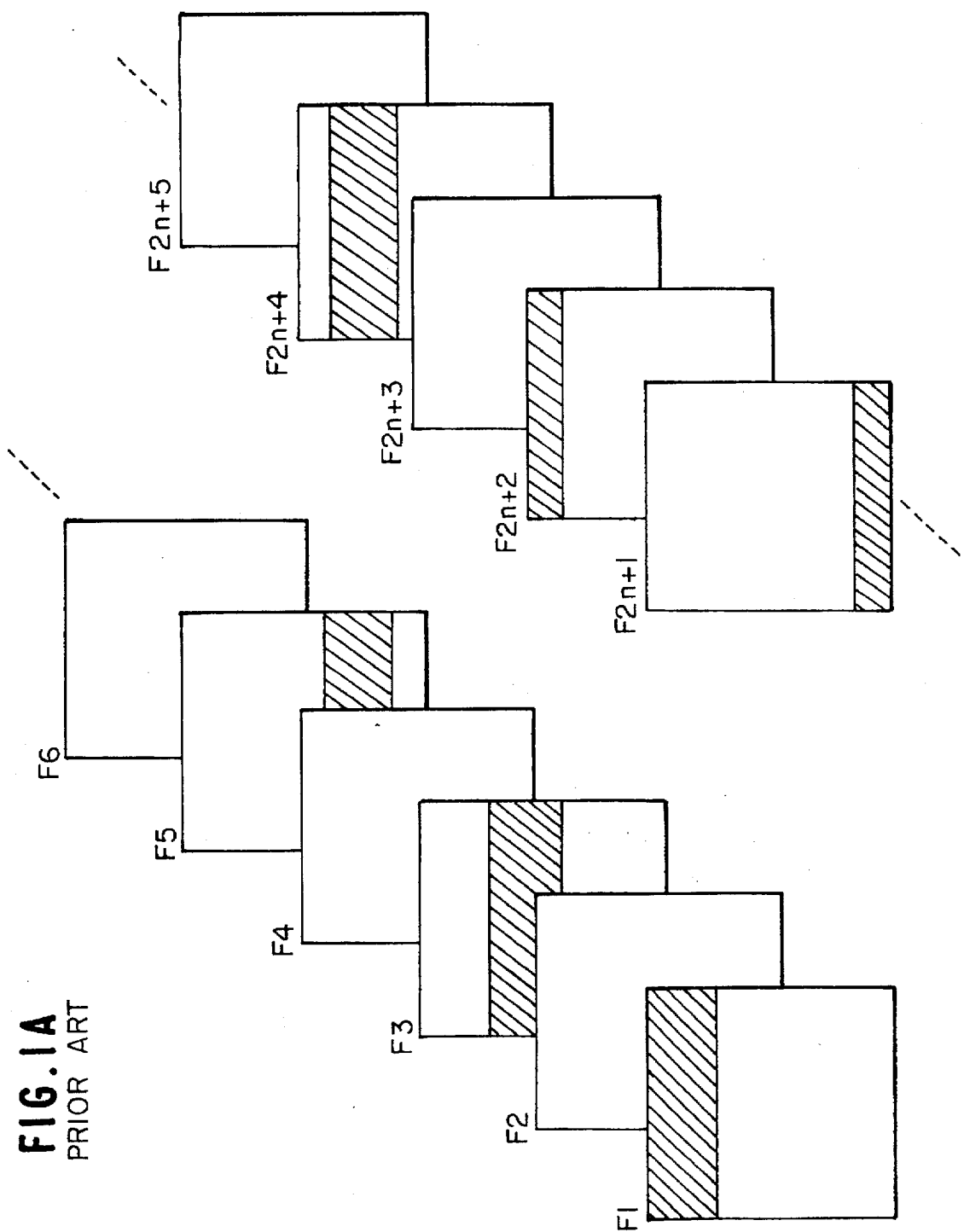
FIG. 1A is a diagram for describing the refreshing operation according to the prior art.
Figure 1B:
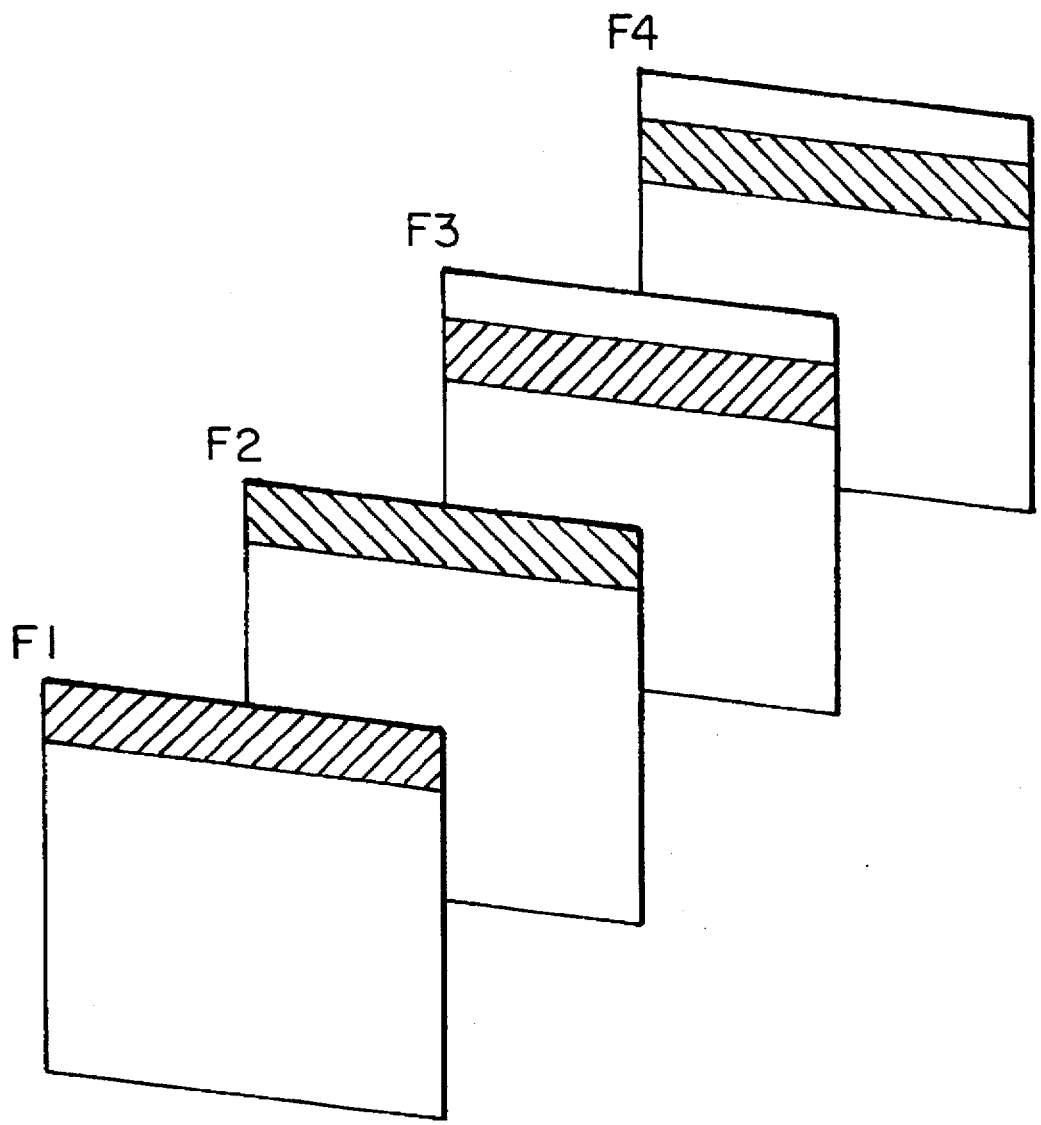
FIG. 1B is a diagram for describing the refreshing operation which is a premise of the present invention.

Before describing the configurations and operations of the preferred embodiments of the present invention, the forced updating, or refreshing, operation which is the premise of the invention will be outlined with reference to FIGS. 1A and 1B, which illustrate four consecutive fields F1, F2, F3 ... of input video signals interlaced at a rate of 2:1. For the convenience of description, F1 and F3 will be hereinafter referred to as odd-number fields, and F2 and F4, as even-number fields. Each of the F1-F2 pair and the F3-F4 pair constitute a frame of the input video signals.

Conventionally, refreshing takes place in the sequence of scanning lines irrespective of this frame structure of input video signals. For instance, as indicated by leftward inclined hatching in FIG. 1A, the input video signals of the first through tenth scanning lines are subjected to forced intra-field coding in the first frame (F1 and F2 in FIG. 1A). In the second frame (F3 and F4 in FIG. 1A), those of the 11th through 20th scanning lines are subjected to forced intra-field coding.

Unlike this conventional refreshing, according to the present invention, the scanning lines of the same frame, i.e. those occupying the same position in the image in fields F1 and F2, for instance, are refreshed. While the input video signals of the scanning lines to be refreshed in odd-number fields (the leftward inclined hatched parts in FIG. 1B) are subjected to intra-field coding as according to the prior art, the scanning lines to be refreshed in even-number fields are subjected to inter-field coding.

Generally, video signals representing fine patterns or moving objects achieve a higher coding efficiency in interfield coding than in intra-field coding. Therefore, the quantity of codes required for refreshing can be reduced by subjecting the scanning lines to be refreshed in even-number fields to interfield coding. This means that the aforementioned overhead in buffer occupancy control can be reduced to improve the picture quality.

Furthermore, according to the invention, refreshing is separately performed for odd-number fields and even-number fields as illustrated in FIG. 1B. Supposing that, as in the example of FIG. 1A, there are ten scanning lines to be refreshed per frame, five scanning lines each in odd-number and even-number fields are to be refreshed according to the invention. Then, the temporary increase in the quantity of codes due to refreshing will be about half that in the case of FIG. 1A. This means that the temporary increment of buffer occupancy due to refreshing is halved and the picture quality will be improved as a result.

Figure 2:
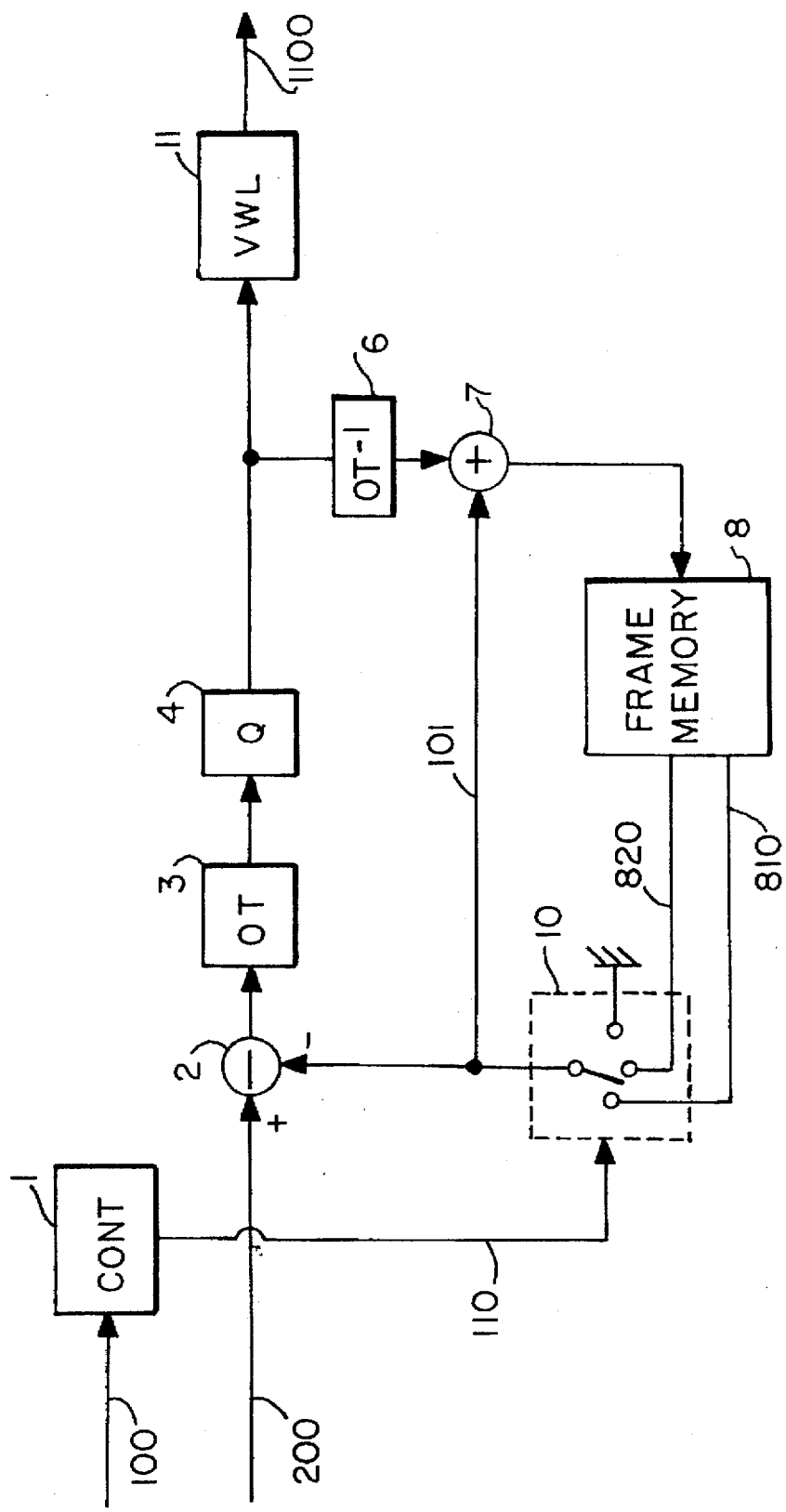
FIG. 2 is a block diagram illustrating a first preferred embodiment of the invention.

Next will be described a first preferred embodiment of the invention with reference to FIG. 2. This first embodiment comprises a subtracter 2 for generating a prediction error signal by subtracting a prediction signal from input video signal 200; an orthogonal transformer 3 for subjecting the prediction error signal to orthogonal transformation, for instance a discrete cosine transformation, to supply orthogonal transformed coefficients; a quantizer 4 for quantizing the orthogonal transformed coefficients to supply a sequence of quantized orthogonal transformed coefficients; an inverse orthogonal transformer 6 for subjecting the sequence of quantized orthogonal transformed coefficients to inverse orthogonal transformation to generate a reproduced prediction error signal; an adder 7 for adding the prediction signal and the reproduced prediction error signals to generate a local decoded signal; a frame memory 8, into which the local decoded signal is entered, for supplying an inter-frame prediction signal 810 and an interfield prediction signal 820 in parallel; and a first switch 10 for selecting one out of the interframe prediction signal, the interfield prediction signal and a fixed zero value in accordance with a first switch control signal 110, and supplying it as the prediction signal. This first embodiment also includes a variable word length coder 11 for subjecting the sequence of quantized orthogonal transformed coefficients to variable word length coding, and storing a variable word length coding sequence into a buffer memory (not shown).

This first embodiment further includes a control circuit 1, to which synchronization signals synchronized with the input video signals 200, for instance a horizontal synchronization signal and a vertical synchronization signal, are supplied, for outputting the first switch control signal 110, which consists of two bits including information indicating whether or not the entered video signal is of a scanning line to be refreshed and a field distinction signal indicating distinction between odd-number and even-number fields.

Next will be described the operations of the first embodiment.

First will be described a case in which no refreshing takes place, i.e. the first switch supplies the interframe prediction signals 810 as the prediction signal. The subtracter 2 subtracts the prediction signal 101 from the input video signal 200 to generate the prediction error signal (an interframe prediction error signal). The orthogonal transformer 3 subjects the prediction error signal to orthogonal transformation to transform it into a sequence of orthogonal transformed coefficients. This sequence of orthogonal transformed coefficients is supplied to the quantizer 4 to be quantized, and a sequence of quantized orthogonal transformed coefficients is supplied. This sequence of quantized orthogonal transformed coefficients is supplied to the inverse orthogonal transformer 6 and the variable word length coder 11.

The inverse orthogonal transformer 6 inversely quantizes the quantized orthogonal transformed coefficients, and supplies the reproduced prediction error signal, which is added by the adder 7 to the prediction signals 101 from the first switch 10 to generate a local coded signal. The local coded signal is supplied to the frame memory 8. As stated above, the interframe prediction signal 810 and the interfield prediction signal 820 are supplied from the frame memory 8 to the first switch 10, which selectively supplies the interframe prediction signal 810 as prediction signals 101.

Meanwhile, the quantized orthogonal transformed coefficients entered into the variable word length coder 11 are subjected to variable word length coding, and written into a buffer memory (not shown) via a signal line 1100.

So far has been described the operation of the first embodiment when no refreshing takes place, i.e. when video signals of the scanning lines in the unhatched part in the example of FIG. 1B are to be coded (hereinafter to be referred to as the "first operation mode").

Next will be described the operation of the first embodiment when video signals in the odd-number fields are to be refreshed (hereinafter the "second operation mode"), i.e. when video signals of the scanning lines in the left-ward inclined hatched part in the example of FIG. 1B are to be coded. As stated above, in this case, the first embodiment executes intra-field coding. In this instance, the first switch 10 supplies a fixed zero value as the prediction signal under the control of the first switch control signal 110. Then the subtracter 2 supplies the input video signal 200 as it is. The output of the subtracter 2, i.e. the same signal as the input video signal 200 in this case, is supplied to the orthogonal transformer 3, which supplies the orthogonal transformed coefficients of the input video signals 200. These orthogonal transformed coefficients are quantized by the quantizer 4, and the quantized orthogonal transformed coefficients are supplied to the inverse orthogonal transformer 6 and the variable word length coder 11. The quantized orthogonal transformed coefficients are subjected to variable word length coding by the variable word length coder 11, and supplied to the signal line 1100. The quantized orthogonal transformed coefficients are also supplied to the inverse orthogonal transformer 6 to generate a reproduced input video signal. The reproduced video signals are stored into the frame memory 8 to be used for generating the interframe prediction signal and the interfield prediction signal for the subsequent video signal. Here is completed the description of the second operation mode of the first embodiment of the invention.

Now will be described the operation of the first embodiment when video signals in the even-number fields are to be refreshed (hereinafter the "third operation mode"). Referring to FIG. 1B, this operation mode corresponds to the case in which video signals of the scanning lines in the rightward inclined hatched part are to be coded. In this instance, the first switch 10 selects the interfield prediction signals 820 as the prediction signal under the control of the first switch control signal 110. All other elements of the operation are the same as in the first operation mode. But it has to be noted that, as the first switch supplies the interfield prediction signals 820 as prediction signals, the subtracter 2 in this third operation mode supplies a interfield prediction error signal and the quantizer 4 supplies a quantized and orthogonally transformed interfield prediction error signal. In this manner, in the even-number fields, refreshing is made by using interfield coding.

Since this first embodiment uses interfield coding, which excels in coding efficiency over intra-field coding, for the refreshing of even-number fields as described above, not only can there be provided a coding method and apparatus superior in overall coding efficiency but also, as stated above, can the quantity of temporary increase in buffer memory occupancy at the time of refreshing be approximately halved, so that there can be provided a coding method and apparatus for video signals which can reproduce images of higher quality.

Figure 3:
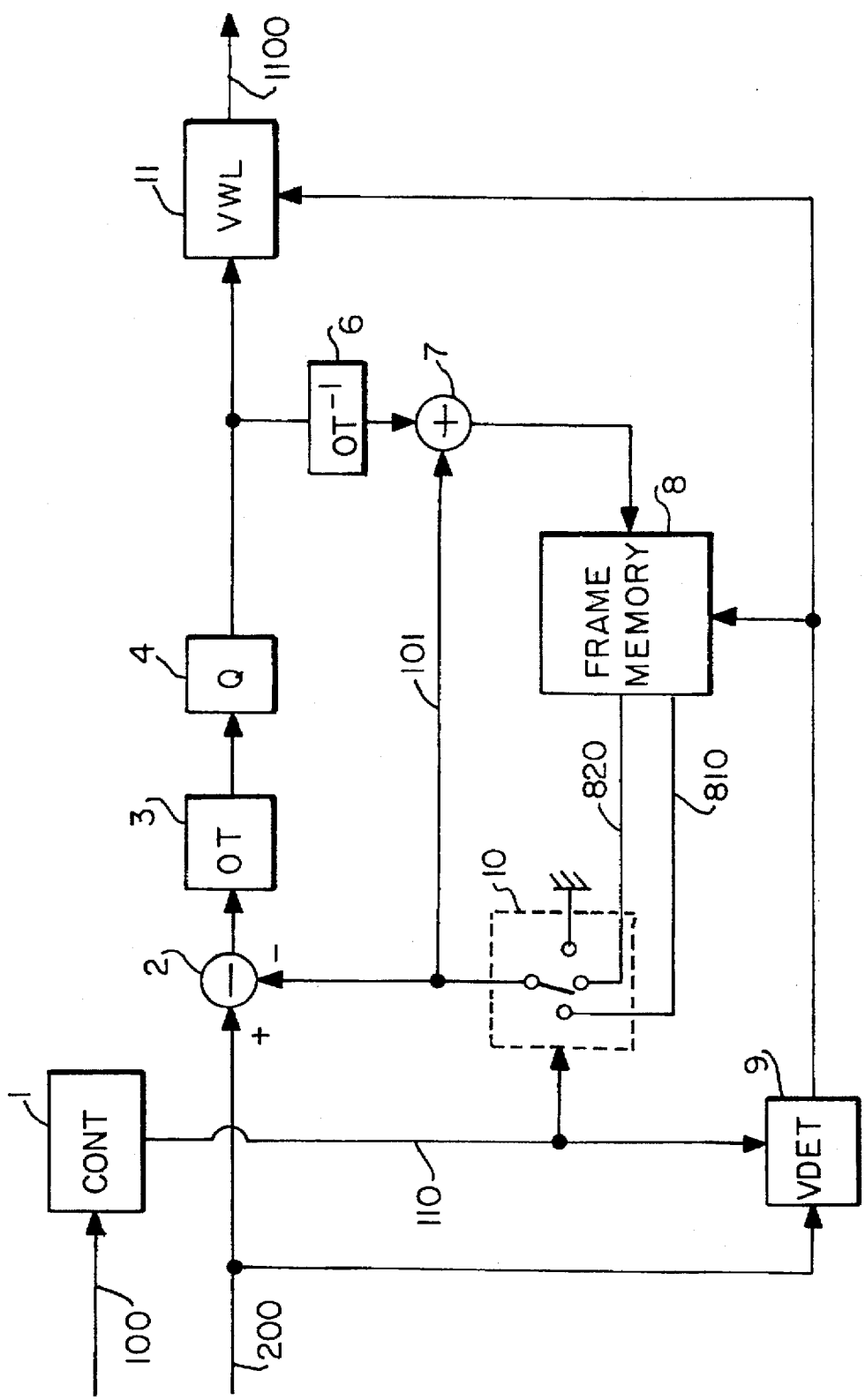
FIG. 3 is a block diagram illustrating a second preferred embodiment of the invention.

Next will be described a second preferred embodiment of the present invention with reference to FIG. 3.

This second embodiment differs from the first embodiment in the following three respects, (a) through (c).

(a) A motion vector detection circuit 9 is added.

This motion vector detector 9 detects the motion vectors indicating the motions of the input video signal 200, and supplies the motion vectors to the frame memory 8 and the variable word length coder 11. To this motion vector detector 9 is supplied the first switch control signal from the control circuit 1 and, when this first switch control signal indicates a given scanning line to be one to be refreshed, the motion vector detector 9 supplies a zero vector, i.e. a motion vector indicating that the picture is still, irrespective of the result of motion vector detection.

(b) The output of the motion vector detector 9 is supplied to the frame memory 8.

In this second embodiment, the frame memory 8 supplies as its output interframe prediction signal 810, a preceding signal spatially shifted according to the motion vector, i.e. a motion compensated interframe prediction signal, to the signal line 810.

(c) Motion vectors are supplied to the variable word length coder 11 in addition to quantized orthogonal transformed coefficients.

The variable word length coder 11 of this second embodiment subject the motion vectors, in addition to the quantized orthogonal transformed coefficients, to variable word length coding. The variable word length coder 11 then multiplexes variable word length codes assigned to the quantized orthogonal transformed coefficients with variable word length codes assigned to the motion vectors, and supplies the multiplexed codes to the signal line 1100.

Because of these differences, the second embodiment, in its first operation mode, i.e. for video signals of the scanning lines in the unhatched part in the example of FIG. 1B, performs the same operations as a conventional motion compensated interframe coding apparatus with orthogonal transformation. In its second and third operation modes, as the output of the motion vector detector 9 is a zero vector, the second embodiment performs the same operations as in the second and third operation modes of the first embodiment except that the variable word length coder 11 subjects not only the output of the quantizer 4 but also the zero vector to variable word length coding.

Next will be described a third preferred embodiment of the present invention. The first and third embodiments differ in the following two respects, (A) and (B), and the configuration and operations of the latter are the same as those of the former in all other respects.

Figure 4:
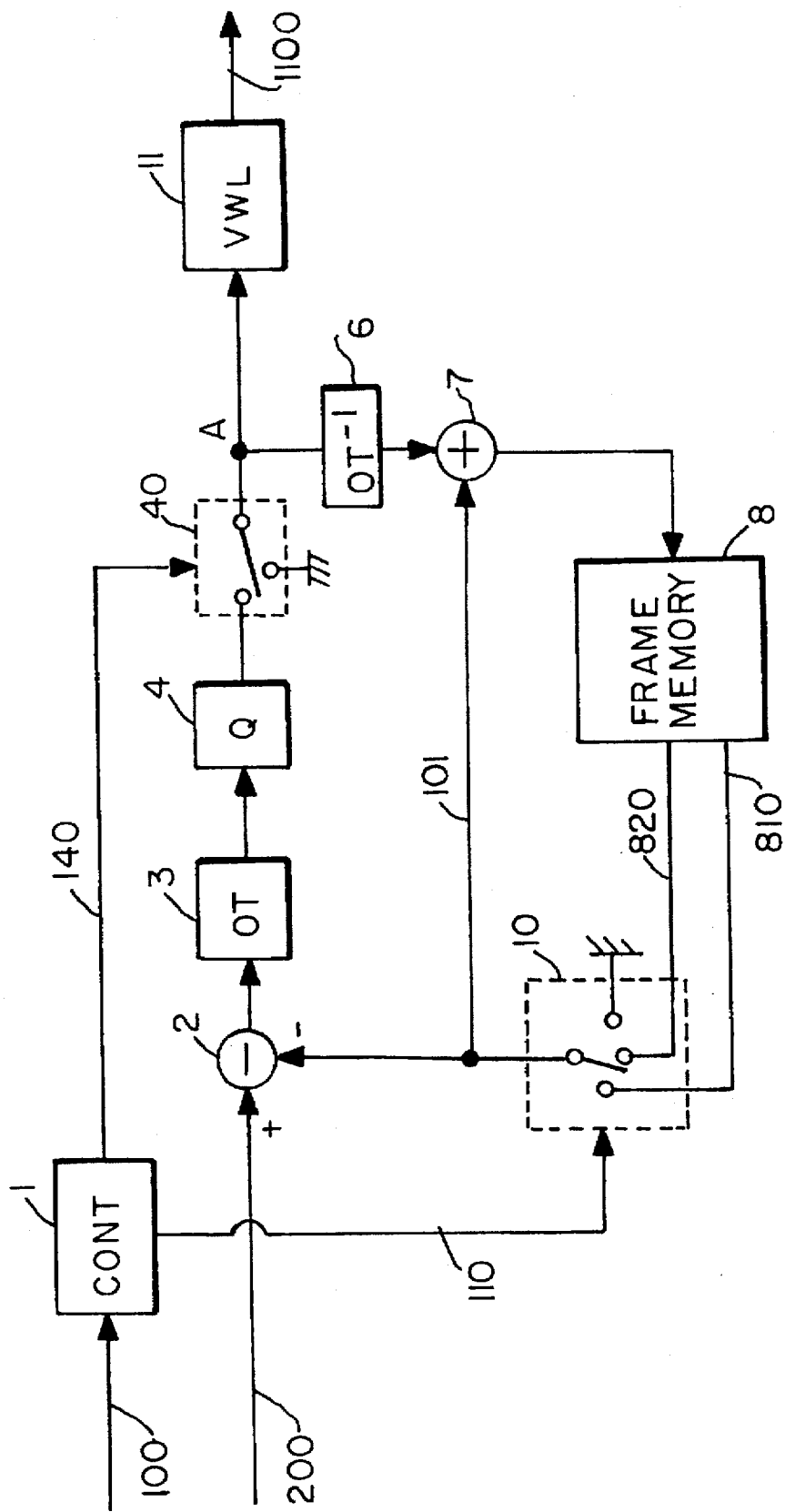
FIG. 4 is a block diagram illustrating a third preferred embodiment of the invention.

(A) A second switch 40 is provided between the connection point A of FIG. 4 and the output of the quantizer 4.

(B) The control circuit 1, in the first and second operation modes, the second switch 40 connects the output of the quantizer 4 and the connection point A. The control circuit 1, in the third operation mode, causes the second switch 40 to supply a zero value.

The third embodiment, as the second switch 40 connects the connection point A and the output of the quantizer 4 in the first and second operation modes, the operations in these modes are exactly the same as those of the first embodiment in its first and second operation modes.

In the third operation mode of the third embodiment, the second switch 40 supplies a zero value to the inverse orthogonal transformer 6 and the variable word length coder 11. In this third operation mode, as stated with respect to the first embodiment, the first switch 10, under the control of the first switch control signal 110, selects interfield prediction signals 820. As the inverse orthogonal transformer 6 outputs a zero value in this operation mode, the adder 7 supplies interfield prediction signals (i.e. the local decoded signal of one field before) and stores it into the frame memory 8. As is well known to persons skilled in the art, the local decoded signal is identical with the video signal reproduced by the decoding apparatus on the receiving side. Therefore, in this operation mode, the reproduced image of the even-number fields on the receiving side is identical with the image of the odd-number fields in the same position on the TV screen. For instance, the leftward inclined hatched part of field F1 and the rightward inclined hatched part of field F2 in FIG. 1B are reproduced as the same images on the receiving side.

Furthermore, since a zero value is supplied to the variable word length coder 11 in the third operation mode, the quantity of codes generated by the variable word length coder 11 is extremely small. Accordingly, this third embodiment can approximately halve the quantity of codes required per frame for refreshing, or forced updating. Here is completed the description of the third embodiment.

Figure 5:
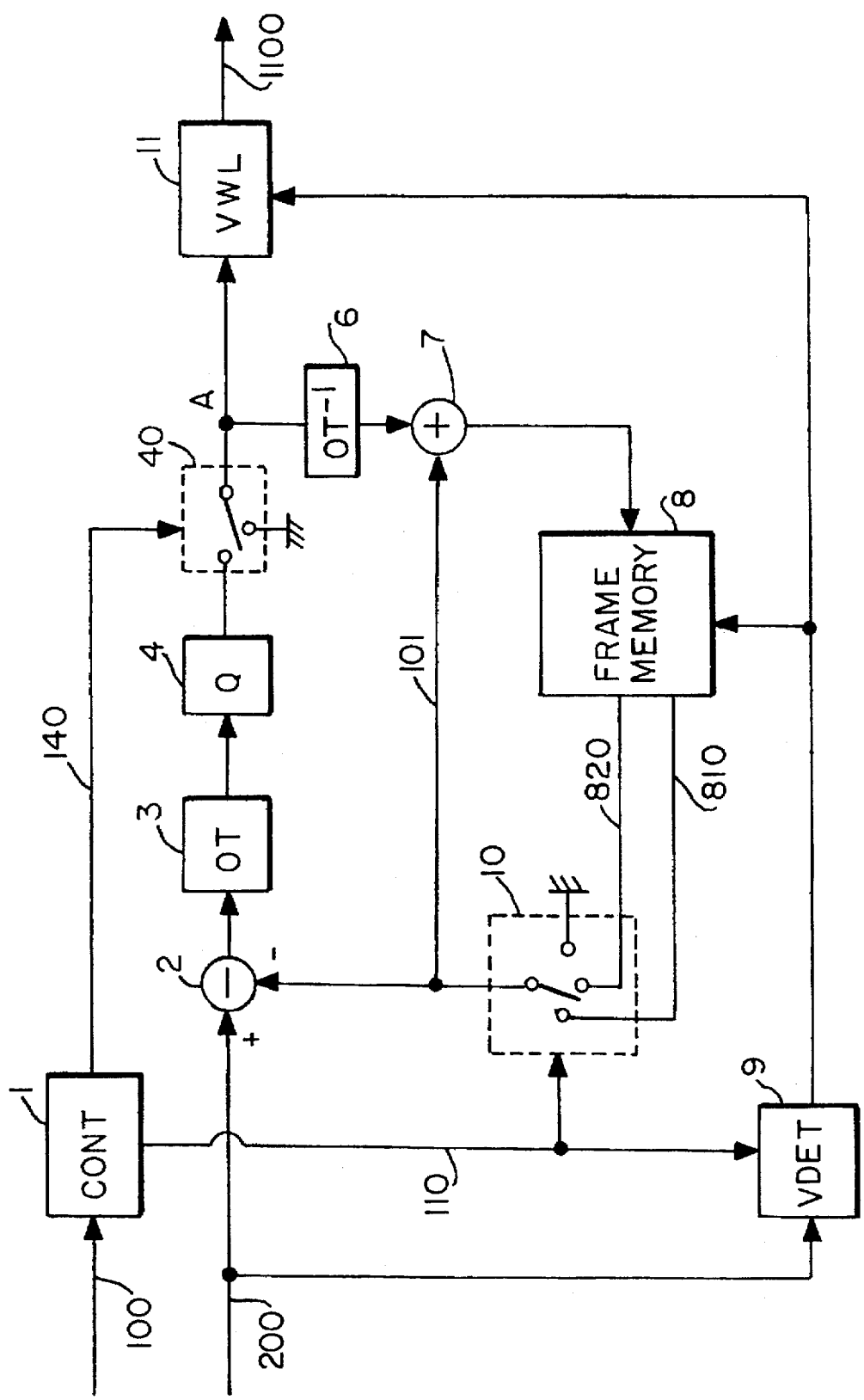
FIG. 5 is a block diagram illustrating a fourth preferred embodiment of the invention.

FIG. 5 is a block diagram illustrating a fourth preferred embodiment of the invention. This fourth embodiment differs from the third embodiment in that the prediction method in its first operation is altered from interframe coding to motion compensated interframe coding. The operations of this fourth embodiment in its first and second operation modes are respectively the same as those of the second embodiment in its own first and second operation modes. The third operation mode of the fourth embodiment are the same as that of the third embodiment except that the variable word length coder 11 also supplies a variable word length code assigned to the zero vector. Therefore, with a view to avoiding duplication, any more description of the fourth embodiment will be dispensed with.

As hitherto described, the present invention can provide a video signal coding apparatus capable of reducing the quantity of codes required for refreshing and present reproduced images of higher quality on the receiving side.

What is claimed is:

1. A coding method for coding input video signals interlaced at a rate of 2:1, comprising the following steps:

(a) identifying a first field and a second field of each frame of an input video signal on the basis of a vertical synchronization signal and a horizontal synchronization signal of said input video signal, and successively designating for forced updating pluralities of scanning lines of each field of each frame on a frame-by-frame basis, wherein said designated scanning lines of each field in an identical frame have an identical respective field position;

(b) generating a first prediction signal by using interframe correlation of said input video signal, for the video signal of the scanning lines not designated at said step (a), and generating a prediction error signal by using said first prediction signal;

(c) generating a prediction error signal, by using intrafield correlation, for the video signal of the scanning lines identified with the first field at said step (a) and designated at said step (a);

(d) generating a second prediction signal by using interfield correlation between the video signals of the scanning lines, identified with the second field at said step (a) and designated at said step (a), and scanning lines of the first field of said each frame, and generating a prediction error signal by using these second prediction signals; and (e) coding the prediction error signals generated at said steps (b), (c) and (d).

2. A method, as claimed in claim 1, wherein the prediction error signals at said step (d) have a zero value.

3. A coding apparatus for coding input video signals interlaced at a rate of 2:1, comprising:

a control circuit for determining whether a first field or a second field have been entered on the basis of a vertical synchronization signal and a horizontal synchronization signal of said input video signal, successively designating for forced updating pluralities of scanning lines of each field of each frame, and supplying a switch control signal indicating whether said input video signal belongs to the first or the second field and whether or not each said scanning line is designated, wherein said designated scanning lines of each field in an identical frame have an identical respective field position;

a subtracter for generating a first signal from said input video signal and a prediction signal;

a conversion circuit for subjecting said first signal to orthogonal transformation and quantization to generate a second signal;

a coding circuit for subjecting said second signal to variable word length coding and supplying a sequence of variable word length codes;

an inverse orthogonal transformation circuit for subjecting said second signal to inverse orthogonal transformation to generate a third signal;

an adder for adding said prediction signal and said third signal to generate a local decoded signal;

a frame memory, to which said local decoded signal is supplied, for outputting a first prediction signal, generated by delaying the local decoded signal by one frame, and a second prediction signal, generated by delaying the local decoded signal by only one field; and a first switch for supplying said first prediction signal as said prediction signal when said switch control signal indicates that the input video signal is not of a designated scanning line;

supplying a zero value as said prediction signal when said switch control signal indicates the first field and a designated scanning line; and supplying said second prediction signal as said prediction signal when said switch control signal indicates the second field and a designated scanning line.

4. A coding apparatus, as claimed in claim 3, further comprising:

a motion vector detecting circuit for detecting motion vectors indicating motions of said input video signals, supplying said motion vector when said switch control signal indicates a given scanning line not to b designated scanning line; and supplying a zero vector when said switch control signal indicates a given scanning line to be a designated scanning line;

wherein:

said frame memory supplies as said first prediction signal a signal resulting from the spatial shifting of the local decoded signal of the preceding frame according to an output of said motion detecting circuit; and said coding circuit codes the output of said motion vector detecting circuit in addition to subjecting said second signal to variable word length coding.

5. A coding apparatus, as claimed in claim 3, further comprising:

a second switch, to which a zero value and the second signal from the conversion circuit are supplied, for supplying said zero value to said inverse orthogonal transformation circuit and said coding circuit when said switch control signal indicates the second field and a designated scanning line, and supplying said second signal to said inverse orthogonal transformation circuit and said coding circuit at all other times.

6. A coding apparatus, as claimed in claim 5, further comprising:

a motion vector detecting circuit for detecting motion vectors indicating motions of said input video signals, supplying said motion vector when said switch control signal indicates a given scanning line not to be designated scanning line; and supplying a zero vector when said switch control signal indicates a given scanning line to be a designated scanning line;

wherein:

said frame memory supplies as said first prediction signal a signal resulting from the spatial shifting of the local decoded signal of the preceding frame according to an output of said motion detecting circuit; and said coding circuit codes the output of said motion vector detecting circuit in addition to subjecting said second signal to variable word length coding.

* * * * *